(12) United States Patent
Mayer et al.

(10) Patent No.: US 7,270,175 B2
(45) Date of Patent: Sep. 18, 2007

(54) EXTENDED IMPINGEMENT COOLING DEVICE AND METHOD

(75) Inventors: Robert R. Mayer, Manchester, CT (US); Charles D. Stoner, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 274 days.

(21) Appl. No.: 10/754,240

(22) Filed: Jan. 9, 2004

(65) Prior Publication Data

US 2005/0150632 A1 Jul. 14, 2005

(51) Int. Cl.
*F28F 3/12* (2006.01)

(52) U.S. Cl. .................... 165/47; 165/170; 415/116

(58) Field of Classification Search ............ 165/47, 165/170, 168; 415/115, 116, 117
See application file for complete search history.

(56) References Cited

U.S. PATENT DOCUMENTS

| | | | |
|---|---|---|---|
| 4,494,316 A * | 1/1985 | Stephansen et al. ........... 34/68 |
| 4,526,226 A | 7/1985 | Hsia | |
| 4,573,865 A | 3/1986 | Hsia | |
| 5,001,896 A * | 3/1991 | Hilt et al. .................. 60/800 |
| 5,265,409 A * | 11/1993 | Smith et al. ................. 60/798 |
| 5,329,761 A * | 7/1994 | Ablett et al. ................ 60/804 |
| 5,391,052 A * | 2/1995 | Correia et al. ............. 415/115 |
| 5,423,123 A | 6/1995 | McQuilkin | |
| 5,424,914 A * | 6/1995 | Smith et al. ................ 165/908 |
| 5,782,294 A | 7/1998 | Froemming et al. ........ 165/168 |
| 5,816,777 A * | 10/1998 | Hall .......................... 416/97 R |
| 6,237,344 B1* | 5/2001 | Lee ............................ 165/908 |
| 6,554,563 B2* | 4/2003 | Noe et al. .................. 415/115 |
| 6,779,597 B2* | 8/2004 | DeMarche et al. ......... 165/169 |
| 7,017,334 B2* | 3/2006 | Mayer et al. ............... 60/266 |
| 2003/0131980 A1 | 7/2003 | DeMarche et al. ......... 165/169 |

FOREIGN PATENT DOCUMENTS

| | | |
|---|---|---|
| DE | 4244303 A1 | 6/1994 |
| GB | 2125950 A | 3/1984 |
| JP | 08074508 A | 3/1996 |
| JP | 11200805 A | 7/1999 |

OTHER PUBLICATIONS

International Search Report, dated Mar. 30, 2006.

* cited by examiner

*Primary Examiner*—Ljiljana Ciric
(74) *Attorney, Agent, or Firm*—Carlson, Gaskey & Olds

(57) ABSTRACT

An extended impingement cooling structure to cool outside an air supply plenum comprises an inner wall; an impingement sheet; a series of supports to maintain the inner wall in spaced relation to the impingement sheet, and a baffle supported between the inner wall and the impingement sheet. The baffle has a collector plenum area that receives impingement cooling air from the air supply plenum and a channel in fluid communication with the collector plenum and extending outside the air supply plenum with openings to allow impingement cooling air to pass therethrough and having a series of lands extending into the channel wherein the lands are located in proximity to impingement cooling air outlets in the inner wall.

7 Claims, 6 Drawing Sheets

EXTENDED IMPINGEMENT COOLING DEVICE AND METHOD

This invention was made under a United States Government Contract No. F33657-01-C-1240 and the United States Government may have certain rights to this invention.

TECHNICAL FIELD

This invention relates to cooling of portions of a gas turbine engine. More particularly this invention relates to impingement cooling of portions of a liner outside of an air supply plenum.

BACKGROUND ART

Impingement cooling has been used in gas turbine engines for some time. Relatively cooler air is taken from the compressor of the engine and passed through a series of holes in an impingement sheet to direct jets of cool air directly onto a surface in need of cooling. For instance in the area downstream from the combustor section of turbine engines impingement cooling has been used to cool the liner to protect parts that may be damaged by high heat from the core gas flow passes over the surface of the liner. The liner has a series of larger holes that are offset from the first series of holes to create a pressure drop that facilitates the airflow across the hot surfaces of the liner. See for instance U.S. Pat. No. 5,782,294.

Certain areas of these liners cannot be adequately cool by impingement air flow because the air supply plenum is blocked by other equipment or structures located in proximity to the impingement sheet. In the past, there have been various structures proposed to indirectly cool the blocked areas. One such structure includes a series of apertures in the sidewall of a cast heat shield that in turn has a second series of apertures in the surface that is co-linear with the liner.

SUMMARY OF THE INVENTION

One aspect of the present invention comprises an extended impingement cooling structure to cool outside of an air supply plenum that comprises an inner wall; an impingement sheet; and a series of supports to maintain the inner wall in spaced relation to the impingement sheet. The structure also includes a baffle supported between the inner wall and the impingement sheet that has a collector plenum area that receives impingement cooling air from the air supply plenum and a channel in fluid communication with the collector plenum and extending outside the air supply plenum with openings to allow impingement cooling air to pass therethrough and having a series of lands extending into the channel wherein the lands are located in proximity to impingement cooling air outlets in the inner wall.

A further aspect of the present invention is a baffle to direct impingement cooling air to portions of an inner wall comprises a collector plenum area that receives impingement cooling air from an air supply plenum and a channel in fluid communication with the collector plenum and extending beyond the air supply plenum. The channel has openings to allow impingement cooling air to pass therethrough; and a series of lands that extend into the channel wherein the lands are located in proximity to impingement cooling air outlets in the inner wall.

A still further aspect of the present invention comprises a method of impingement cooling an area of an inner wall beyond an air supply plenum that includes the steps of receiving impingement cooling air in a collector plenum and transferring the impingement cooling air from the collector plenum through a channel to an opening beyond the air supply plenum. Next the impingement cooling air is passed through the opening onto the inner wall; and then the impingement cooling air is passed out through openings in the inner wall.

Other aspects and advantages of the present invention will become apparent upon consideration of the following detailed description.

DETAILED DESCRIPTION OF THE PREFERRED EMBODIMENTS

Figure 1:
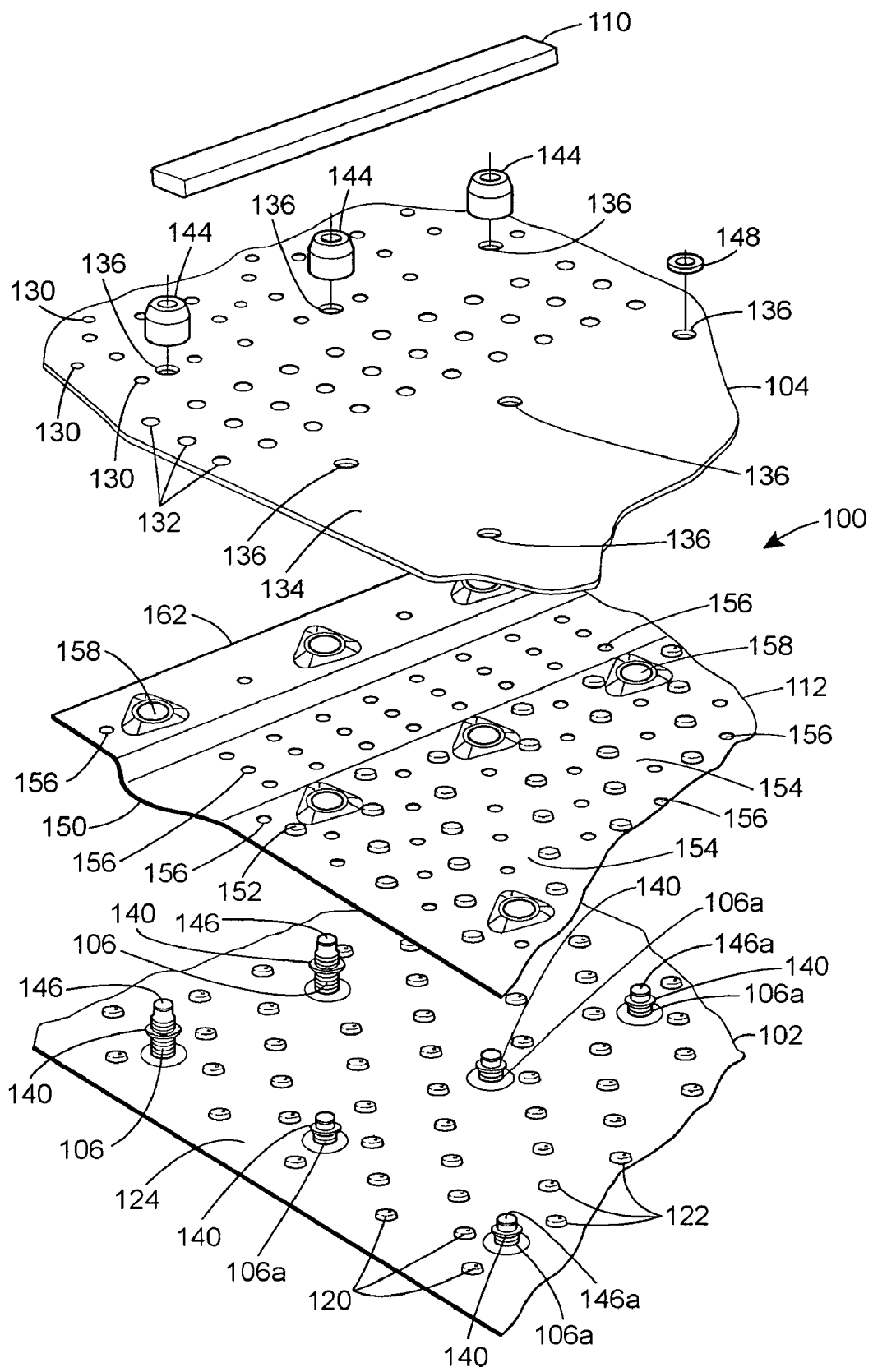
FIG. 1 is an exploded isometric view showing one aspect of the cooling structure and baffle of the present invention.
Figure 2:
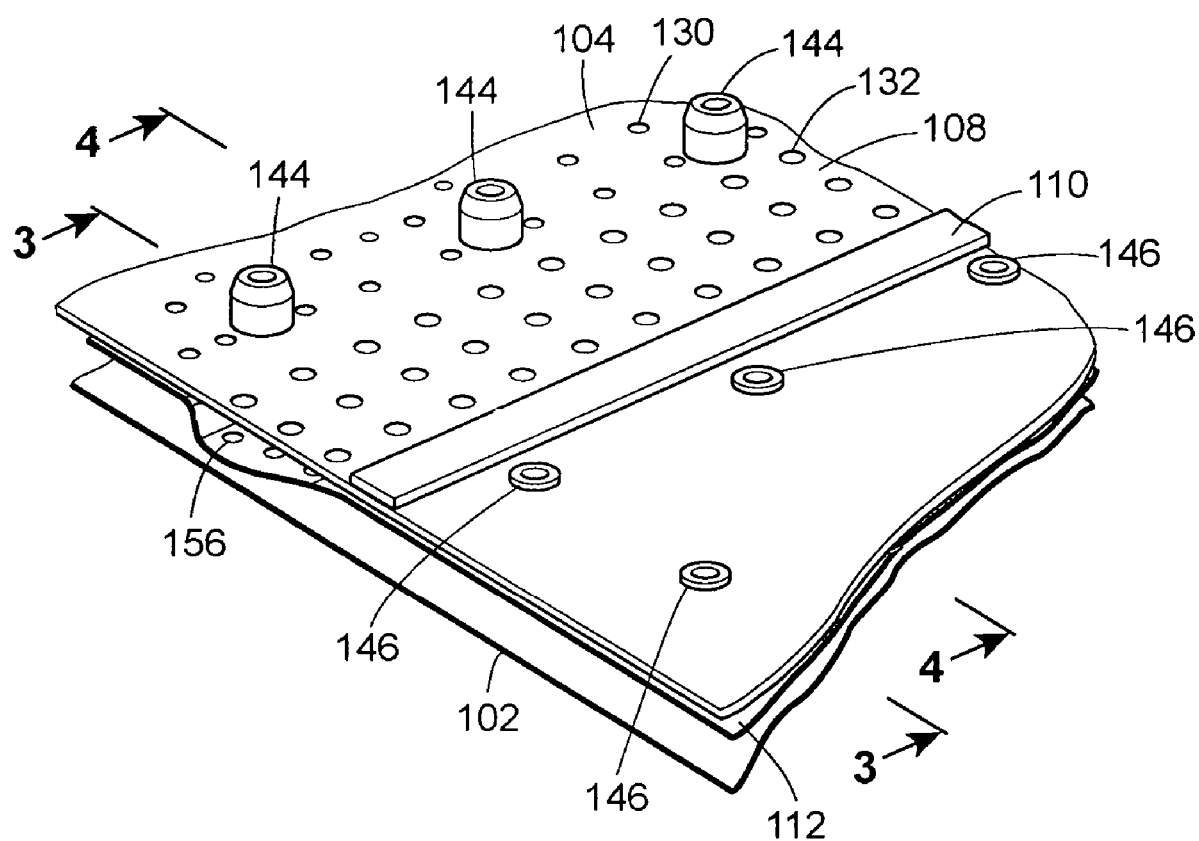
FIG. 2 is an isometric view of the cooling structure of FIG. 1.
Figure 3:
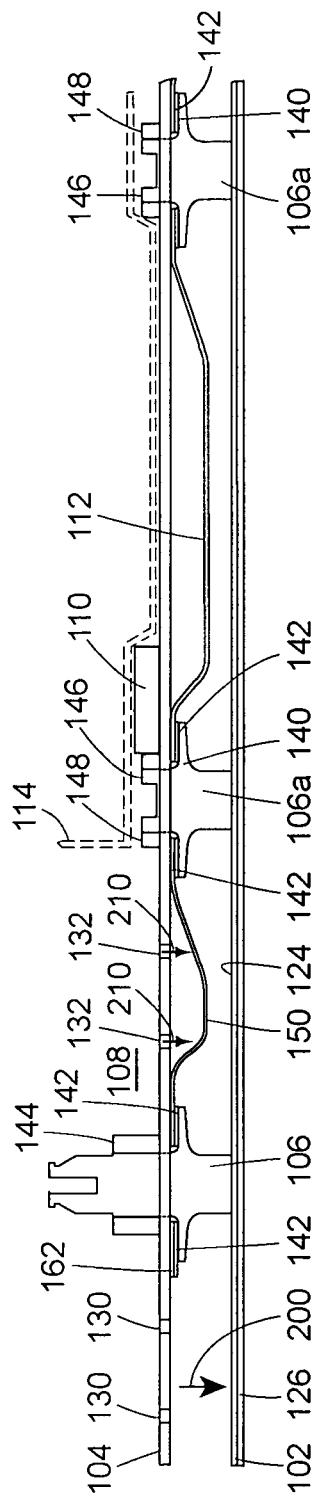
FIG. 3 is a view taken generally along the line 3-3 in FIG. 2.

Referring to FIGS. 1 and 2, a liner 100 for a high temperature application such as the exhaust area of a turbine engine has an inner wall 102, an impingement sheet 104, spacers 106 and 106a, and an air supply plenum 108 having a seal 110. In addition, portions of the liner 100 will have a baffle 112 to direct impingement air, as discussed below, to areas of the inner wall beyond the air supply plenum seal 108. As shown in FIG. 3, an interfering structure 114 (shown in phantom lines), such as an air pump shroud, may prevent the air supply from within the air supply plenum 108 from reaching the portions of the inner wall 102 that lie beyond the extent of the area bounded by air supply plenum seal 110. The structure also includes a tip (not shown) that forms a seal to further direct impingement air through the baffle 112.

Figure 4:
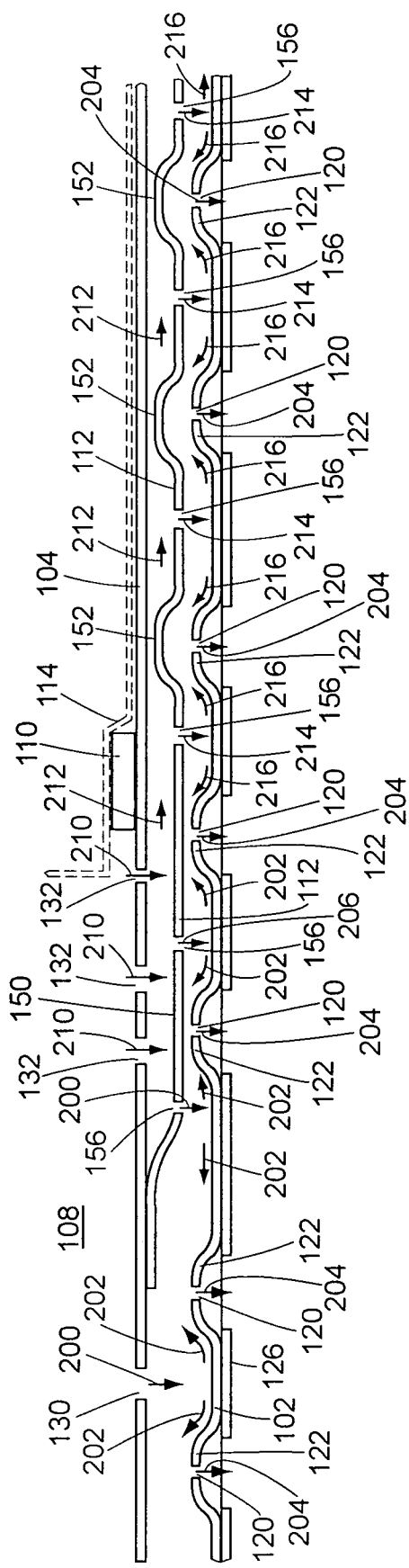
FIG. 4 is a view taken along the line 4-4 in FIG. 2.
Figure 5:
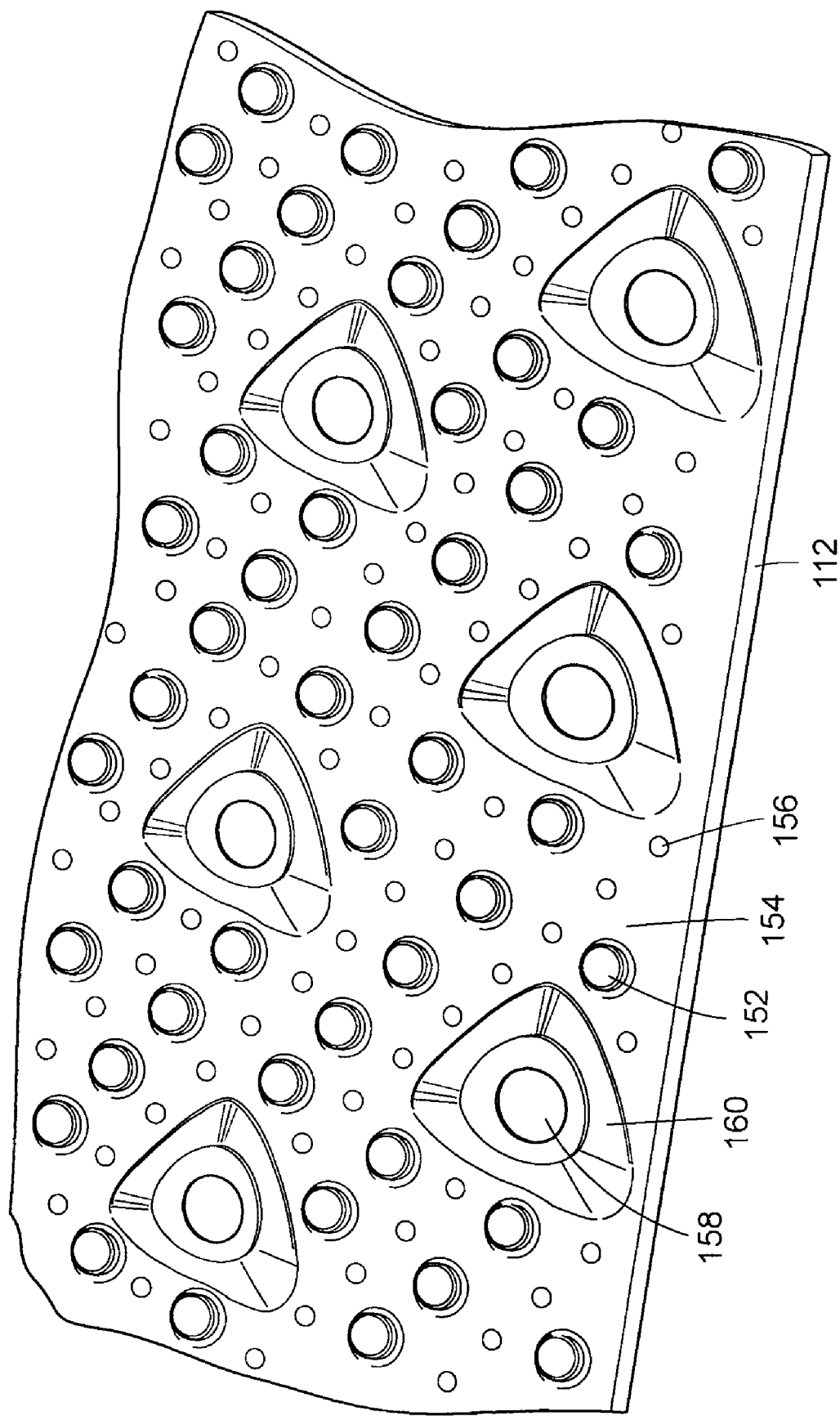
FIG. 5 is a plan view of a portion of one embodiment of the baffle of present invention.
Figure 6:
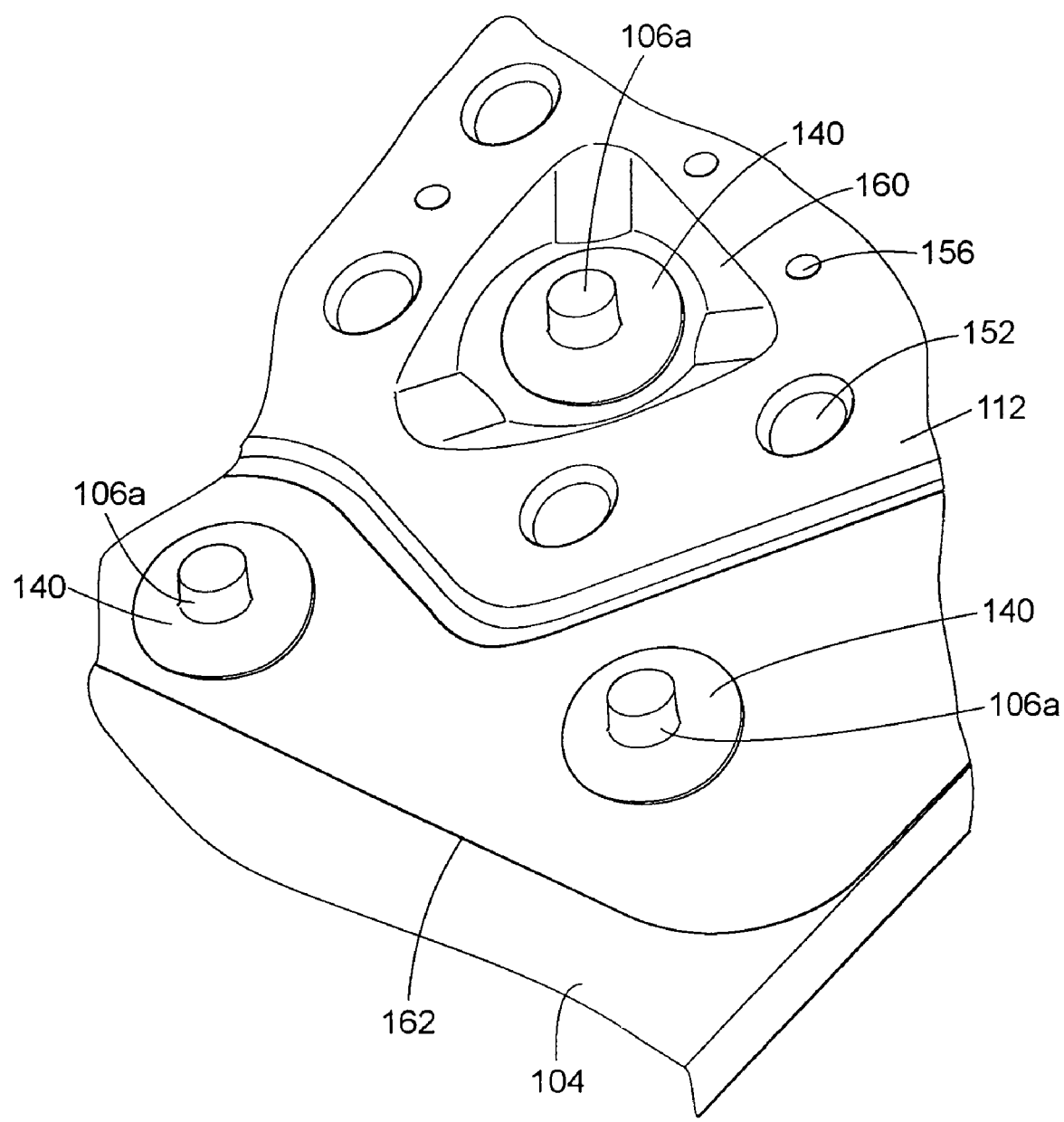
FIG. 6 is a plan view of a portion of the opposite side of the baffle of FIG. 5 attached to an impingement sheet.

The inner wall 102 has a series of apertures 120. These apertures are located within a series of lands 122. The lands 122 serve to meter the air flow along an inner surface 124 of the inner wall 102 so that the inner wall 102 is more efficiently cooled by the impinging air that strikes the inner surface 124, travels along the inner surface 124 and then exits through apertures 120. The apertures 120 and the lands 122 cover the entire inner wall 102. Also as more clearly seen in FIGS. 3 and 4, the inner wall 102 can optionally have a heat resistant coating 126. The coating 126 provides further heat protection to the liner 100.

The impingement sheet 104 has a series of apertures 130 located in a first area of the impingement sheet 104. These apertures 130 direct cooling impingement air from air supply plenum 108 onto the inner surface 124 of the inner wall 102 in a conventional manner. The impingement sheet 104 has a second series of baffle supply apertures 132. The baffle supply apertures 132 are located in proximity to the portion of the impingement sheet 104 near the air supply plenum seal 110. The baffle supply apertures 132 are larger than the apertures 130 and the baffle supply apertures 132 are also spaced closer together than the apertures 120. The reason for the size and spacing difference is that the baffle supply apertures 132 are supplying cooling air to a larger area to be cooled than the apertures 130 that are directly supplying cooling impingement air to the inner wall 102. The impingement sheet 104 can also have an area 134 outside the air supply plenum seal 110. The area 134 has no apertures 130 or 132. This forms a seal with the tip structure to force the cooling air through the baffle 112. The impingement sheet 104 also has a series of support clearance holes 136. The area 134 will also have support clearance holes 136.

The inner wall 102 is spaced from the impingement sheet 104 by the supports 106. The supports 106 are attached to the inner wall 102 in a conventional manner, such as by welding. The supports 106 have a shoulder 140 to support the impingement sheet 104 away from the inner wall 102. A sealing washer 142 is placed over the support 106 on the shoulder 140. The washer 142 forms a seal that prevents air from passing though the support clearance holes 136. Allowing air to pass through the support clearance holes would reduce the cooling efficiency on the inner wall 102. Even though the washer 142 is shown in direct contact with the shoulder 140, the washer 142 can also be placed between the impingement sheet 104 and the baffle 112. The location of the washer 142 is not particularly important as long as a good seal is formed. A proximal end 146 of the support 106 is shaped to receive a support nut 144 or other fastener. The support nut 144 can be either screwed into place with a locking screw arrangement or can be crimped into place. Also the support nut 144 can also be welded into place after it is in position. For those areas where there is a close clearance, a shorter support 106a also can be used. Support 106a is similar to support 106 except that the proximal end 146a of the support 106a is shorter than the proximal end 146 of the support 106. The support 106a will have a close clearance fastener 148. Typically the fastener 148 will be welded into place to securely hold the impingement sheet 104 against the washer 142 and in spaced relation to the inner wall 102. Other forms of supporting structure can also be used such as a grid structure, integral support members, and the like.

As shown by FIGS. 1 to 6, the baffle 112 has an air collector plenum area 150. The baffle also has a series of lands 152 that are shaped and spaced to correspond with the shape and location of the lands 122 on the inner wall 102. The lands 152 form a series of channels 154 that permit air to flow from the air collector plenum area 150 of the baffle 112 to the entire area of the baffle 112. A series of apertures 156 are formed in the channels 154. The apertures 156 provide impingement cooling air to flow through the baffle 112 directly onto the inner surface 124 of the inner wall 102. There are no apertures 156 that directly align with baffle supply apertures 132. The baffle 112 also has a series of support clearance holes 158 that are located in a corresponding series of support clearance lands 160. The baffle 112 has a leading edge 162 with a sealing surface that is secured to the impingement sheet 104 to form an airtight seal by the supports 106 and a trailing edge (not shown) that is secured to the inner wall 102 by conventional methods to form an airtight seal so that the trailing edge of the baffle 112 is sealed to the inner wall 102. The entire periphery of the baffle 112 forms a seal with the inner wall 102, the impingement sheet 104 or both the inner wall 102 and the impingement sheet 104 to prevent air from escaping and not cooling the inner wall 104. One advantage of the baffle 112 structure as shown is a compact structure that can be placed into a thin environment and provide edge cooling to structures that cannot receive direct impingement cooling air. By having the lands 152 conform to the shape of the lands 122 on the inner wall 102, the cooling airflow is maximized allowing to increased air velocity for impingement cooling and better film cooling as the air travels over the inner surface 124 of the inner wall 102.

As noted previously, air is supplied to the air supply plenum by conventional means such as from an air compressor (not shown). The cooling air will flow from the air supply plenum 108 through the apertures 130 in the impingement sheet 104 onto the inner surface 124 of the inner wall 102 in the direction of arrow 200. As in conventional impingement cooling, after the cooling air strikes the inner surface 124 it then flows along the inner surface 124 of the inner wall providing added cooling effect in the direction of arrows 202 until the air exits through the apertures 120 in the direction of arrows 204.

Air from the air supply plenum 108 also will pass through the baffle supply apertures 132. As noted above, the baffle supply apertures 132 are larger than the apertures 130. Typical sizes for apertures 130 are about 0.030-0.060 inch and for baffle supply apertures about 0.066-0.090 inch. Air will flow through the baffle supply apertures 132 in the direction of arrow 210 and then be directed through the channels 154 in the direction of arrow 212. When the airflow reaches the apertures 156 in the baffle 112, the air will flow directly onto the inner surface 124 of the inner wall 102 to provide cooling effect as above in the direction of arrow 214. The impingement air will then flow along the inner surface 124 of the inner wall 102 in the direction of arrows 216 and exit through apertures 120 as above.

The baffle 112 can be formed from any suitable material for use in a high temperature environment. Typical materials include Inconel 625 or similar malleable alloys with high formability to maximize the relative heights of the various lands in the baffle.

Figure 7:
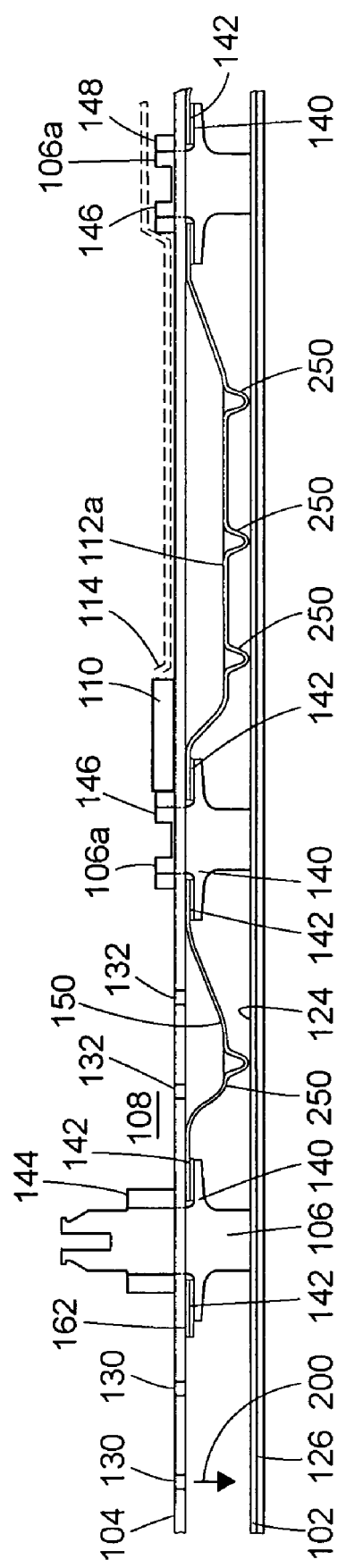
FIG. 7 is a view similar to FIG. 3 of an alternate embodiment.

As shown in FIG. 7, an alternate embodiment of a baffle 112a for use in high pressure environments has a series of projections 250 depending from the baffle 112a and contacting the inner surface 124 of the inner wall 104. The projections 250 add structure and support to the baffle 112a so that the baffle 112a will not flex under high pressures that may be encountered in certain applications. The projections 250 are spaced to provide support without interfering with air flow. In all other respects the baffle 112a is similar to the baffle 112.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. An extended impingement cooling structure to cool beyond an air supply plenum comprising:
   a inner wall;
   an impingement sheet;
   a series of supports to maintain the inner wall in spaced relation to the impingement sheet; and
   a baffle supported between the inner wall and the impingement sheet and having a collector plenum that receives impingement cooling air;
   the baffle having a channel in fluid communication with the collector plenum, the channel extending beyond the air supply plenum and having openings to allow impingement cooling air to pass therethrough and having a series of lands extending into the channel wherein the lands are located in proximity to impingement cooling air outlets in the inner wall; and
   said impingement sheet having a plurality of openings across a surface area, said openings directing air into said collector plenum, and at least one interfering structure mounted on a side of said impingement sheet remote from said baffle, said interfering structure preventing airflow from passing through said openings in said impingement sheet into said collector plenum at least in an area aligned with said interfering structure.

2. The extended impingement cooling structure of claim 1 wherein the impingement cooling air outlets are located in a series of lands on the inner wall.

3. The extended impingement cooling structure of claim 2 wherein the baffle has a shape that conforms to inner wall.

4. The extended impingement cooling structure of claim 2 that includes a series of projections on the baffle that contact the inner wall.

5. The extended impingement cooling structure of claim 1 that includes a series of projections on the baffle that contact the inner wall.

6. The extended impingement cooling structure of claim 1 wherein the impingement sheet has a first series of openings for impingement cooling air and wherein the collector plenum area receives impingement cooling air through a second series of openings that are larger than the first series of openings.

7. The extended impingement cooling structure of claim 1, wherein the interfering structure is a pump shroud.

* * * * *